April 26, 1955     E. E. SPENNER     2,707,111
GAME PLAYING TRICYCLE WITH PASSENGER PLATFORM
Filed Feb. 10, 1954     2 Sheets-Sheet 1
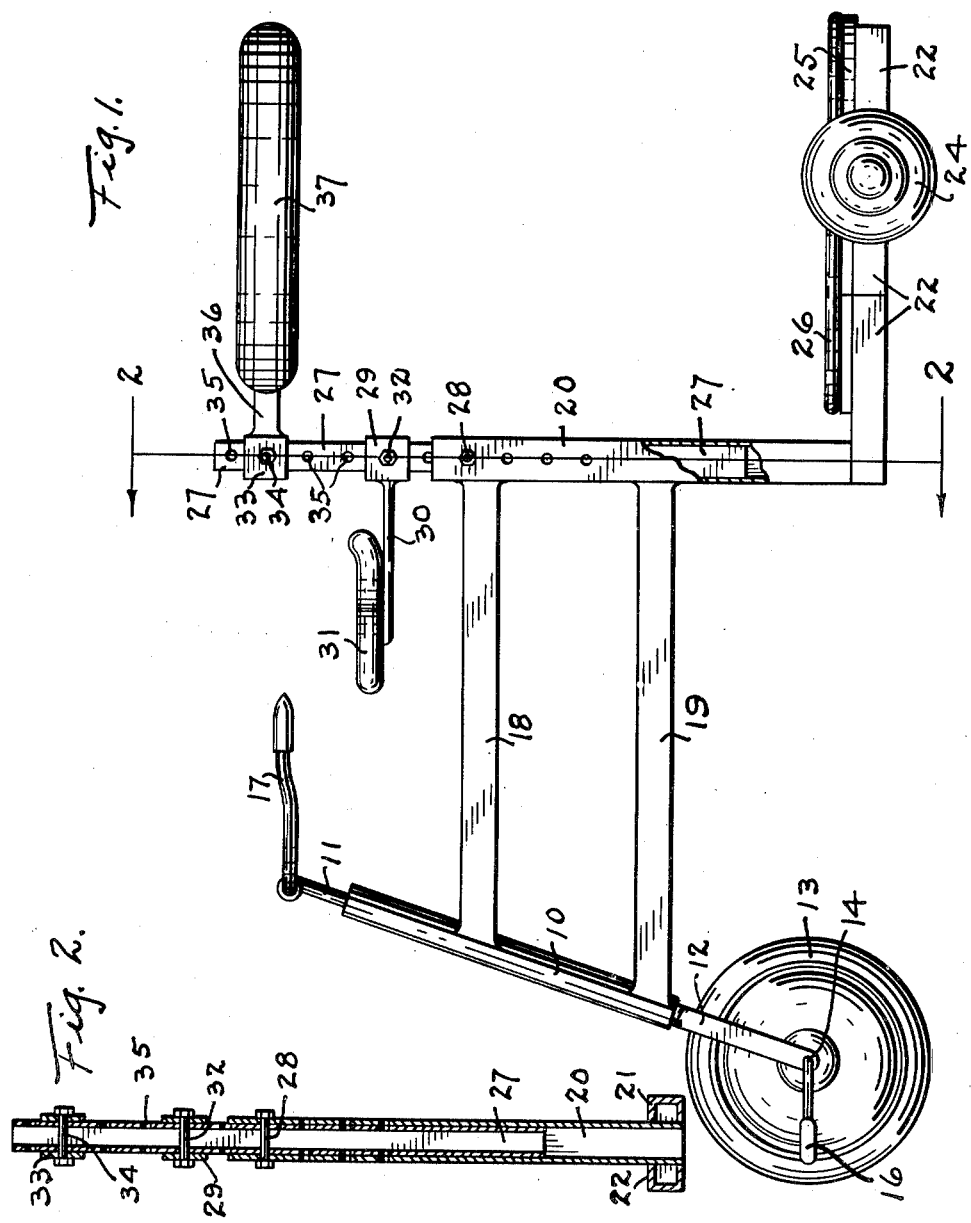
INVENTOR
ELMER E. SPENNER,
BY Herbert A. Minturn,
ATTORNEY

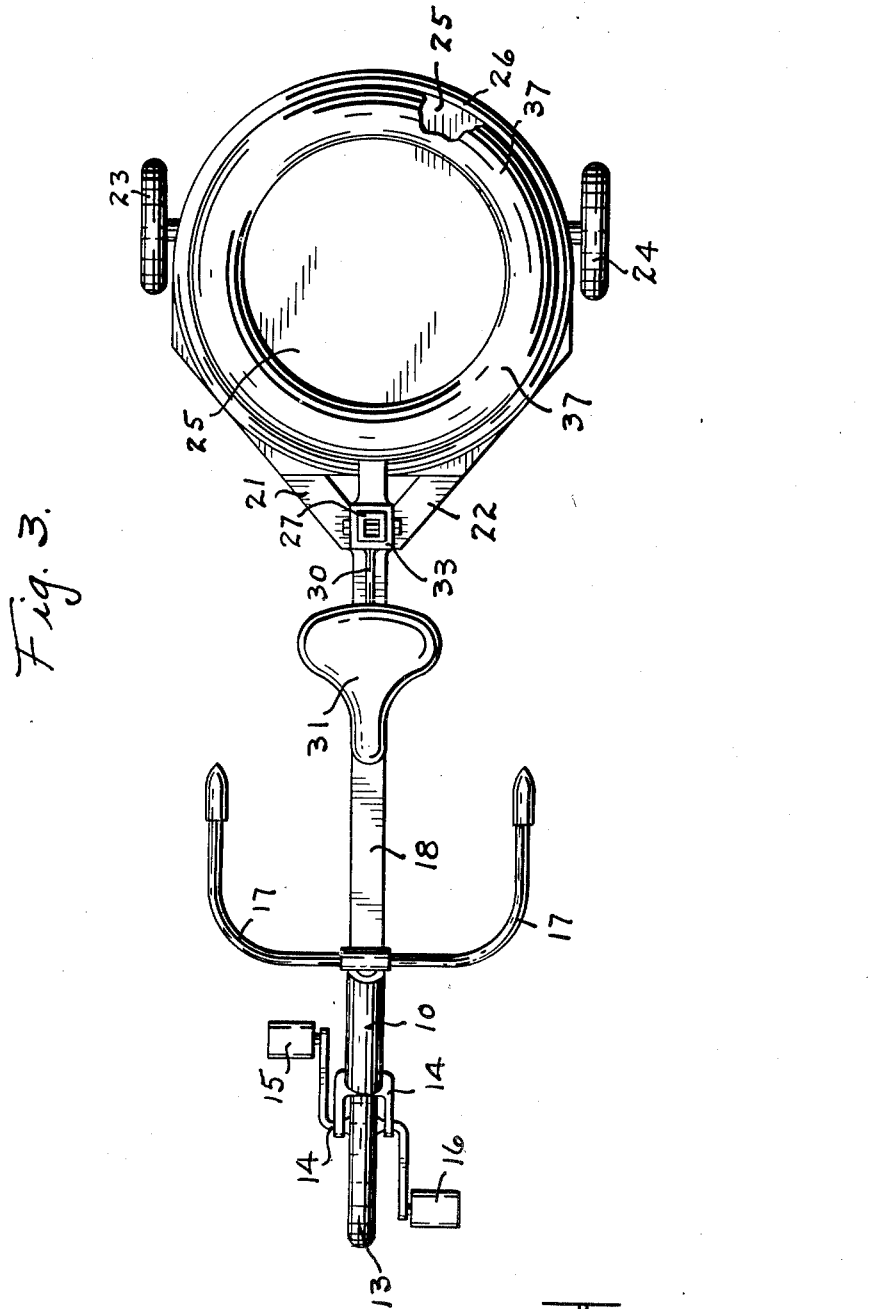

United States Patent Office 2,707,111
Patented Apr. 26, 1955

2,707,111
GAME PLAYING TRICYCLE WITH PASSENGER PLATFORM

Elmer E. Spenner, Indianapolis, Ind.

Application February 10, 1954, Serial No. 409,321

3 Claims. (Cl. 280—202)

This invention relates to a vehicle generally known as a tricycle which is operated by a human being to turn the front wheel by means of pedals, and is designed to carry a second person who does the actual playing in most cases, the two people being interchangeably employed in respect to their position on the tricycle as may be desired. The tricycle is so designed that there is a stand on the rear portion containing an uppermost encircling ring through which the second person stands to be supported on a platform below, and the invention resides in the particular combinations of the various elements in this construction.

A primary object of the invention is to provide a vehicle of the above type as indicated, wherein the vehicle will not only be sturdy in construction, but may be easily and readily manipulated for use in playing games, and the like.

A very important object of the invention is to provide a structure which may be readily accommodated to the various heights of the individuals employing the vehicle, and at the same time provide a very rigid structure which will not change its adjustments while the vehicle is in use.

A still further important object of the invention resides in the unique combinations of the elements as set forth in the accompanying claims, all as described in one particular form in connection with the accompanying drawing, in which Fig. 1 is a view in side elevation of the structure embodying the invention;

Fig. 2 is a view in vertical longitudinal section on line 2—2 in Fig. 1; and

Fig. 3 is a view in top plan of the vehicle.

The vehicle has a front post 10, herein shown as being inclined rearwardly. Through this post 10 is revolubly passed and supported a steering post 11 which carries a fork 12 on its lower end below the lower end of the post 10. Fixed revoluby within the fork 12 is a wheel 13, and this wheel is supported on an axle 14 which has the pedals 15 and 16 extending therefrom, one preferably 180 degrees from the other.

The upper end of the member 11 has fixed thereto a suitable set of handle bars 17. Thus, through the handle bars 17, the front wheel 13 may be turned all in the nature of the usual bicycle front wheel.

Fixed to the front post 10 are a pair of rearwardly extended bars 18 and 19 which have their rear ends fixed to a vertically disposed column 20. This column 20 has fixed to its lower end a generally triangular shaped frame formed of the members 21 and 22 which extend outwardly and rearwardly from the post 20 to carry on each side thereof the supporting wheels 23 and 24. The members 21 and 22 are in close proximity to the floor or ground on which the wheels 23 and 24 are supported, consequently the wheels 23 and 24 are of much smaller diameter than is the front wheel 13 so that the platform 25 which is carried on the members 21 and 22 is also in close proximity to the floor or ground. Platform 25 is planar in nature and substantially horizontally disposed. Around the platform 25 there is fixed a buffer ring 26 to extend slightly above the level of the floor 25.

The upwardly extending column 20 is square in cross section, and contains the lower end portion of a post 27 slidingly fitted therein in a telescopic manner. The post 27 may be adjustably extended from or retracted within the column 20 and fixed at any desired elevation by means of a suitable pin or bolt 28 passing through the column 20 and the post 27.

The post 27 being rectangular in cross section and extending by a length above the top end of the column 20 has slidingly fitted therearound the bracket 29 from which an arm 30 extends forwardly to carry a seat 31 on which the driver sits to operate the pedals 15 and 16 to propel the vehicle. This bracket 29 may be adjustably extended up and down along the post 27 and secured in any fixed position by means of the pin or bolt 32 extending through the bracket and post.

Above the bracket 29 there is slidingly fitted along the post 27 a second bracket 33 which likewise may be fixed in any position along the post 27 by passing a pin or bolt through the bracket 33 and the post 27. For this purpose, as well as for the purpose of adjusting the bracket 29 along the post 27, the post 27 is provided with a plurality of spaced apart holes 35 through which the bolt 34 may be passed. Likewise these holes 35 are utilized as means for passing through the bolt or pin 28 to hold the post 27 in the desired longitudinal position in respect to the column 20.

The bracket 33 carries a rearwardly extended arm 36 on which is fixed a circular ring 37, preferably of a cushion nature such as pneumatic tire, the ring being either inflated or at atmospheric pressure. In any event, the ring 37 must be sufficiently rigid as to remain in a substantially horizontal plane in respect to its top base.

In use, the operator of the vehicle will occupy the seat 31 and reach with his legs to place his feet on the pedals 15 and 16 so as to revolve the wheel 13 to propel the vehicle about the playing floor or ground. A player will place his feet down through the ring 37 to rest them on the floor 25. The ring 37 will be sufficiently spaced vertically from the floor 25 that the player will be supported normally against being thrown off the vehicle while he stands on the platform 25. The ring 37, through the bracket 33 will be vertically adjusted to accommodate the height of the particular player, so that the ring 37 may be placed along his body at the desired elevation up to his waist line. The vehicle, being a three wheel one, will normally be self-supported against turning over, although such a possibility may occur should the operator of the vehicle make too sharp a turn. Normally the vehicle remains upright in its use.

The vehicle may be used in any number of a series of games, including basket ball, hockey, and the like. While the invention has been herein shown in the one particular form, it is obvious that structural variations may be employed without departing from the spirit of the invention, and I therefore do not desire to be limited to that precise form beyond the limitations which may be imposed for the following claims.

I claim:

1. In a game playing tricycle having a steerable, front, driving wheel and laterally spaced apart rear wheels, a frame having a rear vertically disposed column; a platform extending horizontally rearwardly from said column between and supported by said rear wheels; a post telescoping with the upper portion of said column to be vertically extensible and retractible therealong; a seat bracket shiftable along said post carrying a seat forward of the post; a second bracket shiftable along said post; a ring carried by the second bracket spaced above and over said platform; means holding both of said brackets at selected positions along said post; and means holding said post to said column at selected positions of extension therefrom.

2. The structure of claim 1 in which said column and said post are each rectangular in cross-section and post slidingly fits within said column.

3. The structure of claim 2 in which bolts extend through said brackets and said post, and said post and said column as said holding means in each instance.

References Cited in the file of this patent

UNITED STATES PATENTS

| 67,331 | Messick | July 30, 1867 |
| 1,306,738 | Beasant | June 17, 1919 |
| 1,653,583 | Paxson | Dec. 20, 1927 |
| 2,467,941 | Mackowiak | Apr. 19, 1949 |
| 2,670,965 | Ritzel | Mar. 2, 1954 |

FOREIGN PATENTS

| 521,037 | France | Feb. 25, 1921 |
| 805,350 | Germany | July 8, 1949 |